Feb. 13, 1962     B. D. SMITH     3,020,967
VEHICLE SHIFTING APPARATUS
Filed June 23, 1955     3 Sheets-Sheet 1

INVENTOR.
BLANCHARD D. SMITH
BY
*Patrick D. Henry*
ATTORNEY

Feb. 13, 1962　　　　B. D. SMITH　　　　3,020,967
VEHICLE SHIFTING APPARATUS
Filed June 23, 1955　　　　　　　　　　　3 Sheets-Sheet 2

INVENTOR.
BLANCHARD D. SMITH
BY
ATTORNEY

Feb. 13, 1962  B. D. SMITH  3,020,967
VEHICLE SHIFTING APPARATUS
Filed June 23, 1955  3 Sheets-Sheet 3

INVENTOR.
BLANCHARD D. SMITH
ATTORNEY

United States Patent Office 3,020,967
Patented Feb. 13, 1962

3,020,967
VEHICLE SHIFTING APPARATUS
Blanchard D. Smith, 18 Peachtree Circle NE.,
Atlanta, Ga.
Filed June 23, 1955, Ser. No. 517,462
10 Claims. (Cl. 180—1)

This invention relates to a vehicle shifting apparatus and especially to an apparatus of this sort for incorporation in a vehicle structure preferably the front end suspension system, to be operated by power from the vehicle itself to move one end of the vehicle laterally, as when parking the vehicle.

Since the wheel arrangement of the usual vehicle is made for normal straight and limited turn driving it is extremely difficult to drive the vehicle into a narrow or restricted space, such as when trying to park between two closely parked cars. There has always been a demand for an apparatus on the vehicle which would assist the driver in shifting one end of the vehicle directly laterally of the longitudinal center line of the vehicle. With the said end slanted into one end of the parking space the other end of the vehicle is then simply propelled srtaight across into the other end of the parking space. Even in large parking spaces it requires a great amount of effort to cut the front wheels into position, then back several times and forward several times until the vehicle is in alignment off the street. This is aggravated by the fact that on normal mechanical type steering the wheels are hardest to turn when the vehicle is at rest. Even full time power steering does not completely eliminate any of the maneuvering necessary to get the car into alignment with the curb.

It is known in the prior art to try and shift one end of a vehicle by using centrifugal force or centripetal force or combinations of both through the use of power driven weights or shifting forces. However such forces on parts of the vehicle are tremendous at certain stages of movement and constitute a dangerous strain on normal vehicle construction. Furthermore, the sudden impact and forces which must be assumed by the vehicle tires cause great wear and tear thereon and make each parking an expensive operation. Also, the jerks, bumps and pulls exerted upon the vehicle occupants during such a movement are very objectionable.

A primary object of this invention is to provide apparatus for shifting one end of a vehicle laterally without the use of swinging weights or centrifugal force.

One main object of this invention is to provide a front end suspension system having a selectively operated vehicle lateral shifting apparatus incorporated therein.

Another primary object of this invention is to set up an oscillation between the relatively heavy frame and body of the car and the lighter wheel spindle assembly sufficient to practically free a tire casing of its contact with the ground one moment and compressing it with more than its normal load the next so that during the period from compression to release the wheels may be moved sidewise at the bottoms thereof in such manner as to thereby walk the frame smoothly in either pre-selected direction.

An additional object of this invention is to provide a power driven means in a vehicle for shifting the tops and bottoms of tires on one end thereof in conjunction with apparatus for lifting the tires practically free of the ground during one instant of the shifting thereof.

A further object resides in the combining of the present apparatus with conventional steering and suspension apparatus so that the regular upper and lower suspension arms on the front end thereof and the usual shock absorber may be modified to include the present apparatus without changing normal driving characteristics of these members when in regular driving position.

Other objects may be found in the modified type shock absorber which may be used with the present invention and in the manner of using the present invention with either a universal or ball joint type suspension.

Generally described the present invention may be found in a more practical form specifically mentioned as applied to a ball joint front suspension. However the invention is as easily applied to the universal king pin type of suspension. In its broadest inventive form the apparatus comprises a power means from the vehicle engine if desired, a driven member engageable to exert force downwardly on the tire casing thereby compressing the tire more than normal, means releasing said force permitting said tire to spring upwardly from the ground, means starting said vehicle frame and body in motion upon compression of said tire, and other means for moving said tire top and bottom alternately in and out according to the direction intended, by virtue of which said body and frame begins motion in the direction intended and said tires on that end of the vehicle shift in and out to keep the frame in motion and to follow the movement of the body in the intended direction. As mentioned heretofore, this causes an oscillation which, following the laws of mechanics, finds the heavy body and frame moving only slightly while the lighter wheel assembly has relatively the greater travel.

In a more particular form, as will be described hereinafter, the power drive may be in the form of a crank shaft mounted on the frame adjacent each front wheel and receives rotation from the vehicle engine. The upper and lower control arms of the front wheel suspension have a modified shock absorber therebetween which can be made into a rigid crank arm on the crank shaft. The upper suspension arm is on another part of the crank shaft so that when the apparatus is set into motion (never possible when under normal driving as seen later on) the crank compresses the tires, the upper control arm starts the body in motion and, when the tires spring up, shifts the wheel. A more detailed understanding of this is had by reference to the following description taken in conjunction with the accompanying drawings wherein:

Figure 1:
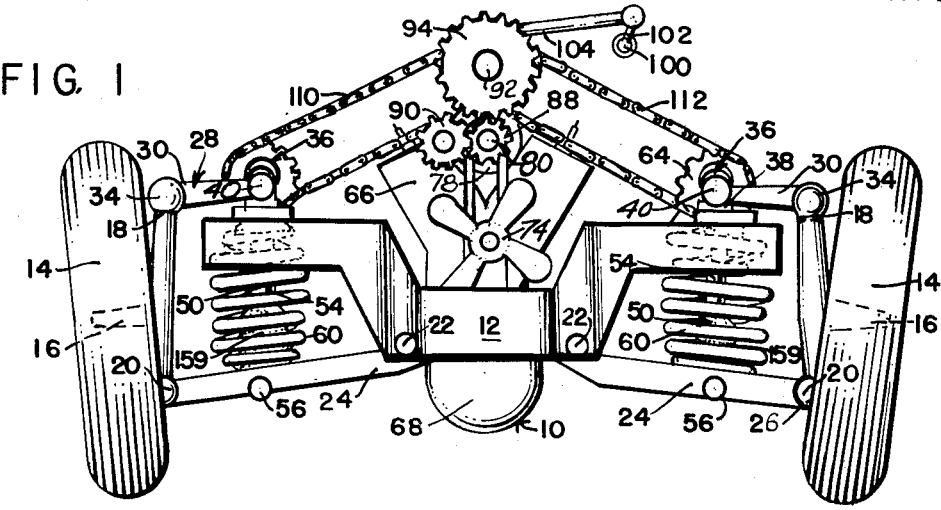
FIG. 1 is a front elevation view of a vehicle with the present apparatus incorporated into the ball joint front end suspension.

Beginning with FIG. 1, a vehicle 10 has a rigid frame 12 and a pair of front tires 14 mounted on wheels and spindles 16 which extend respectively into upper ball members 18 and lower ball members 20. Each wheel suspension for the purpose of this description is identical in reverse with the other. The lower control arms 24 are each forked members and each is attached by a pair of pins 22 to two points on the frame 12 and merge at the outward end thereof into a ball housing end 26 attached to the ball on a respective bottom ball member 20. Upper control arms 28 each are likewise in the form of a front arm 30 and a rear arm 32 which merge at the outward end thereof into a ball housing attaching end 34.

Mounted on frame 12, adjacent each of the front wheels, is a crank member 36 rotatable in bearing blocks 38 on the frame and having end crank portions 40, 42 to which are rotatably connected the journals 44, 46 of a respective upper control arm 30, 32. Spaced 180 degrees of arc from said end crank portions 40, 42 and located substantially in the center of the crank is another crank portion 48 positioned above a shock absorber 50 and having the split connecting bearing 52 of shock absorber rod 54 connected thereto.

Shock absorber 50 is mounted on and between crank member 36 and lower control arm 24 by a pin 56 on arm 24 and with an upper cup 58. The shock absorber 50 is located internally of a large coil spring 60 having the bottom thereof resting in a lower cup 62 on the pin 56 and the top thereof confined in the bottom of cup 58. Normally the shock absorber 50 and spring 60 act as resilient resistance to all movement between the frame 12 and the arms 28 and 24. However, by actuating a pull cable 61 the shock absorber can be made to become a rigid piston rod from its connection with crank member 48 at 52 to the bottom pin 56 on bottom control arms 24. The details of these will be described more fully later on in conjunction with the FIGS. 6, 7, and 8.

Attached to crank member 36 between a pair of bearing blocks 38 is a sprocket 64 receiving a lock pin and rod 65 which acts as a safety. Mounted on frame 12 is an engine 66 with crankcase 68, drive pulley 70, fan pulley 72, fan 74, and drive belt 76. Between the two sides of the engine block is mounted the generator 78 which has been modified. The front of a generator shaft 80 has the usual pulley 86 but is further modified to include a small gear 88. Next to the small gear 88 on a shaft fixed to engine 66 is an idler gear 90 in mesh therewith for purpose of reverse motion as will be explained. Supported for slight rocking motion on and above generator 78 on a bracket 91 is a shaft 92 having a driving gear 94 at the front thereof for selective mesh with either gear 88 or gear 90 depending upon the position of the shaft 92. Gear 88 is driven by the pulley belt 76 which in turn drives gear 94 either direct, or if reversal is desired, through gear 90. Shifting is effected by means of a shifting rod 100 acting on a toggle link 102 to a shifting lever 104, actuatable from inside the driver's compartment. Attached to the rear of shaft 92 is a pair of sprockets, 106, 108 with a respective chain 110, 112 leading respectively to one of the sprockets 64 on opposite sides of the vehicle. With this arrangement, each of the crankshafts 48 on both sides of the vehicle is driven from one of the sprockets 106, 108 which in turn rotate with shaft 92 being driven from gear 94 through either gear 88 or 90 from generator shaft 80. Gear 94 rotates clockwise when in straight mesh with gear 88 and counter-clockwise when driven through idler 90. Therefore, by engaging gear 94, the cranks 48 can be made to turn the shock rod 54 which is made rigid to become a piston rod therewith. With shock absorber 50 locked, piston rod 54 is cranked between the body and the lower control arms 24 which in turn act through balls 20 on the resilient tire. Upper ball joints 18 are cranked by this action from position O (normal) to positions X and Y. Crank 36 in its up position has a stroke distance from its center line to each side somewhat greater than the upper ball travel. Conventional with all present day automobiles, wheels 14 revolve about their respective axis of spindles 16 touching the ground at a ground contact point (see FIGS. 3 and 4) on the center of the circumferential periphery of the tire on wheel 14 and there is a diametrically opposed top point on top of the wheel 14 and its tire as determined through the center of the wheel 14 and the axis of spindles 16, as shown in the dotted lines in FIG. 3. This dotted line, a diameter of the wheel 14 at the center of the tire, revolved about its axis establishes what is generally known as the central "rolling diameter" while this single imaginary line itself is the reference line for the camber or the camber angle of a wheel. In FIG. 6, line O represents the normal ball position to give normal camber while lines X and Y are abnormal positions to which the wheel is shifted for parking when using the present invention thereby shifting the wheel 14 about this upright diametrical axis to change the camber angle. Camber angle, if any, and the camber line, which would be a vertical line if there is no camber angle, are normally fixed constants and remain unchanged during the vehicle operation, both moving and at rest. In the operation of the present invention, as the vehicle is lifted from the ground, wheels 14 are shifted by changing from side to side until the vehicle is parked (see dotted lines FIG. 3 and 4 and also FIG. 5 movement). All of the foregoing discussion relative to camber angle, rolling diameter and the like is conventional material and further discussion may be found in many books, such as the one published by Goodheart-Willcos Company, Inc., Chicago, Illinois, in 1951, entitled "Auto Mechanics Manual on Brakes and Steering" at pages 103 et seq. During the parking action the wheels 14 move from a position where the top of wheels 14 are shifted inwardly and the bottom outwardly as the diametrical axis shifts to a position where the top is shifted outwardly and the bottom inwardly and therefore the bottom of the wheel 14 at times is ahead of the side of frame 12 and at times the top of wheel precedes the frame side 12. Accordingly, the wheels 14 are being "walked" sidewise during parking.

Figure 2:
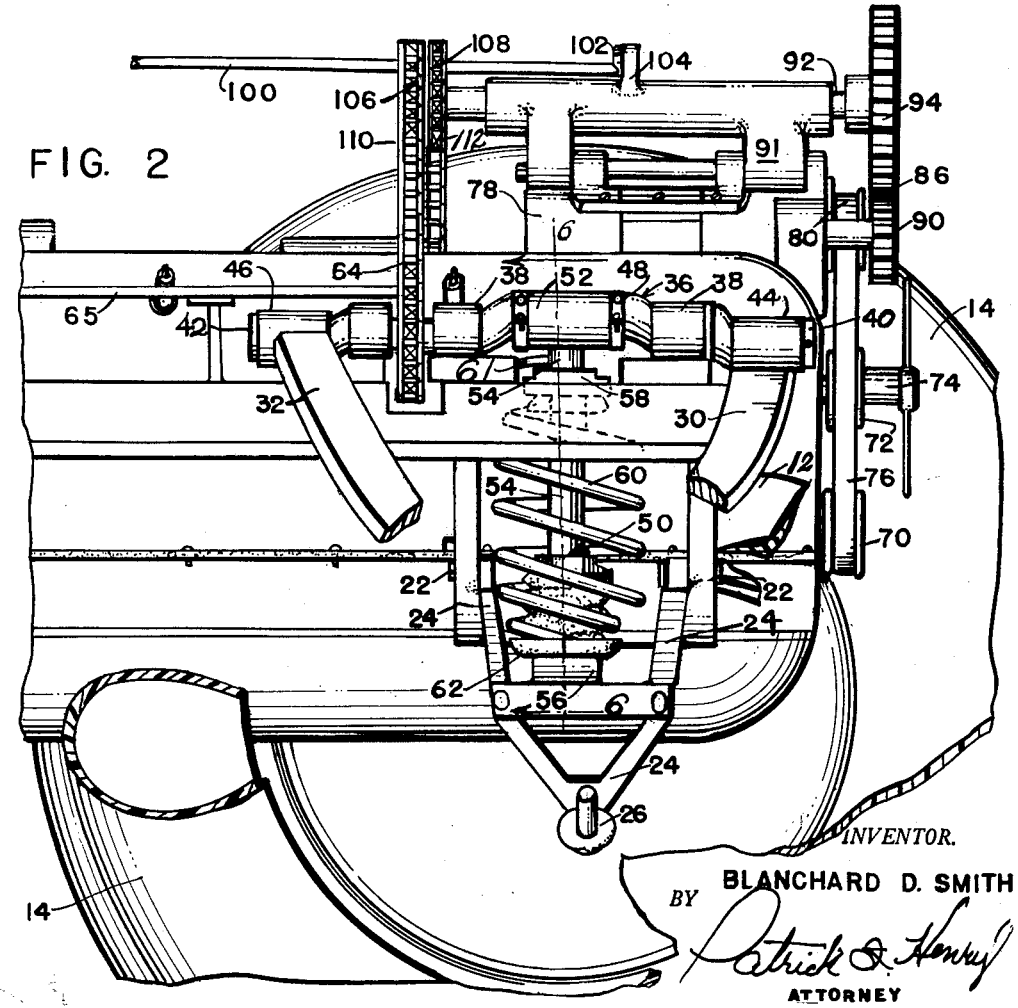
FIG. 2 is a side elevation view of the front end of the device in FIG. 1 with a portion of the tires and suspension arms broken away.
Figure 3:
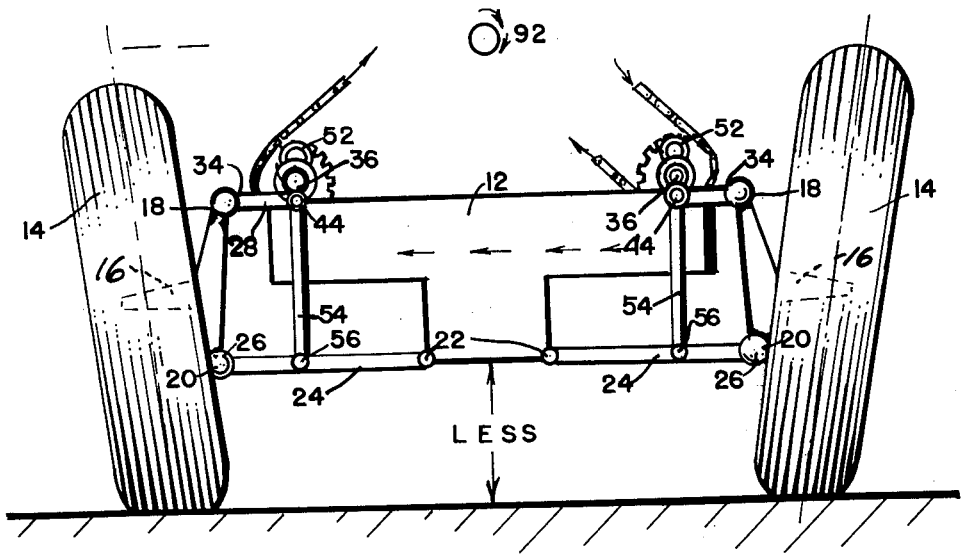
FIGS. 3 and 4 are diagrammatic or schematic diagrams of the vehicle arrangement of FIG. 1 starting sidewise movement cycle in FIG. 3 and making another movement to the full lines of FIG. 4 and completing same in the dotted lines of FIG. 4.
Figure 4:
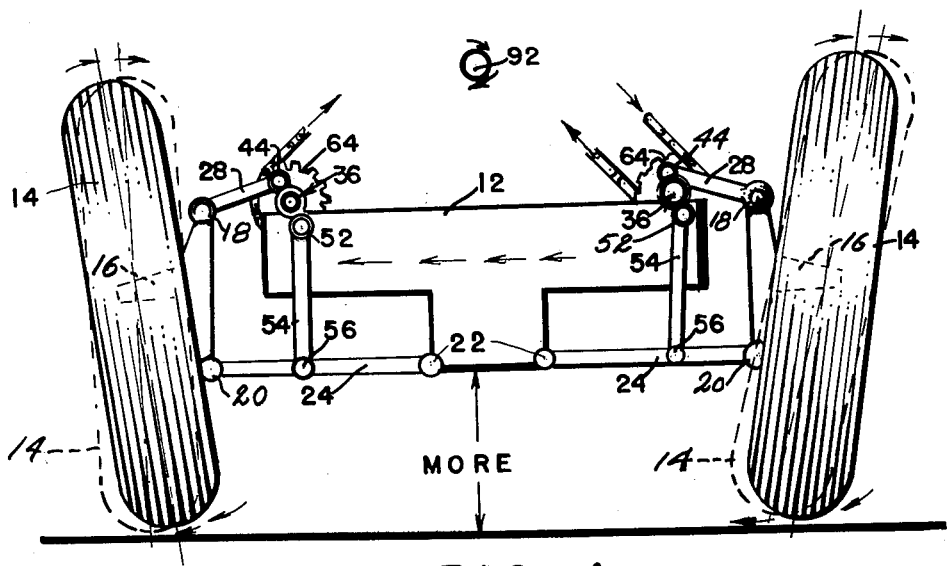
Figure 5:
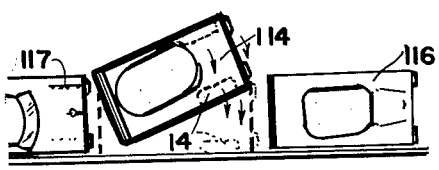
FIG. 5 is a top plan view of the vehicle parking by the present invention.
Figure 6:
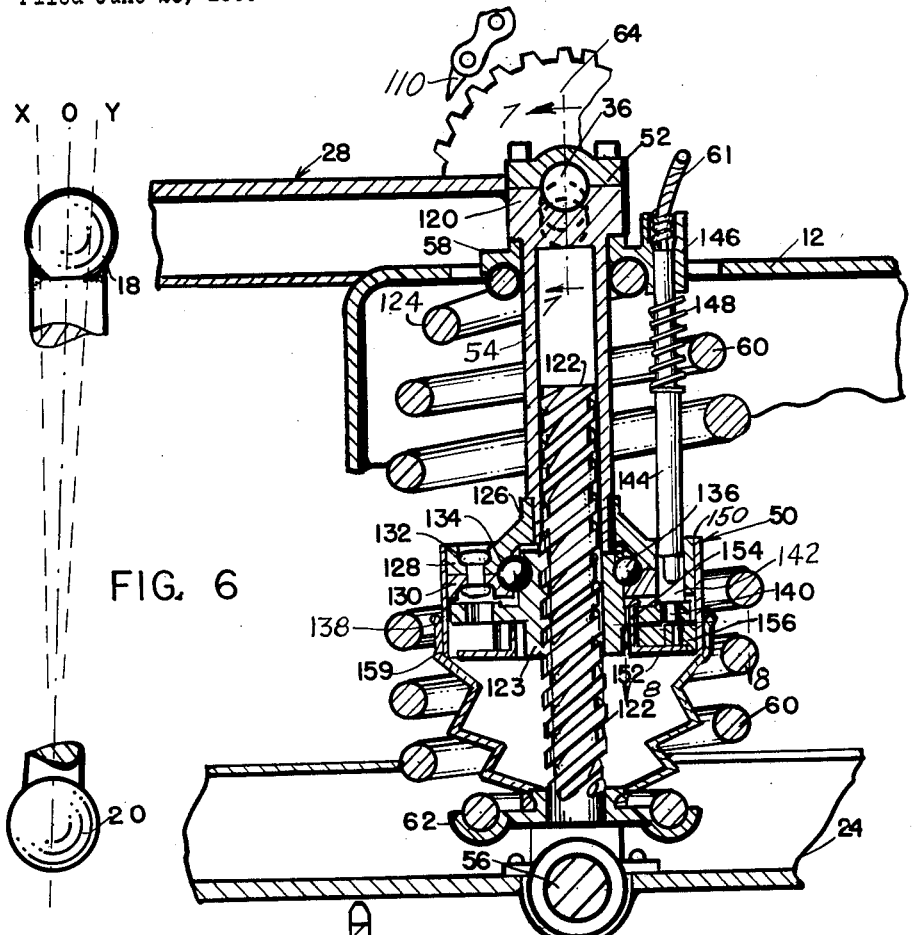
FIG. 6 is a cross-sectional view taken substantially along the line 6—6 in FIG. 2 showing details of the mechanism.

The action resulting from the aforementioned locking of shock absorber 50 and turning of cranks 48 is seen by referring to the diagrams in FIGS. 3, 4 and 5 where parts are diagrammatically shown by simple levers having the same indicia as their counterparts in the actual FIGS. 1 and 2. It has been stated previously that a pull cable 61 on each shock absorber 50 will cause it to become rigid and the mechanism causing this will be discussed fully with FIGS. 6, 7 and 8 after the operation of this invention has been fully explained. Having brought the vehicle to rest with the rear end backed into position inside and at one end of a parking space as illustrated in FIG. 5, pull cables 61 are actuated for each wheel 14 and gear 94 engaged directly with gear 88 to turn shaft 92 clockwise in both FIGS. 1 and 3. The cranks 36 are thereupon rotated at fairly high speed by respective sprockets 64 causing the tire casing to be flattened considerably one instant and lifted practically free of the road the next instant; soon after the crank 36 has passed bottom center, the frame is near its highest elevation and it is during this interval of the cycle that the bottom of the tire casing is free or lightly loaded and the cranks 40 and 42 on top center are moving the top ball joint in a lateral direction over the road for its new stepping position. At this time the casing is moved laterally relative to the frame in the direction intended (according to the pre-selected direction of shaft 92 as selected by the operation of the shifting lever 100). Since tire casings are flexible laterally, as evidenced in going around a curve, there could be some slight distortion therein, particularly just before and after the step is accomplished.

From the normal driving position in FIG. 1, assume it is desired to park a vehicle 114 between two parked cars 116, 117 with a space just about the length of vehicle 114. The vehicle 114, with apparatus of the present invention, is backed into position of the full lines, as shown in FIG. 5, still in normal driving engagement of FIG. 1. Shifting lever 100 is actuated. The ends of rods 65 are disengaged from sprockets 64, and with shaft 92 rotating clockwise sprockets 64 rotate and gain speed cranking the crank member 36 with increasing revolutions per minute until the proper amount of force is created, which is hereinafter referred to as the "proper speed". Then with sprockets 64 at the proper speed and with crank portion 48 and lever 54 in the up position, in FIG. 3, the force and body weight is greatest through levers 54 and pins 56 downwardly on tire casings 14 compressing them into the ground. The crank portions 40, 42 with upper control arms 28 are at this time pulling against the balls 18 causing the body and frame 12 to start in the direction to the left in FIG. 3 which is the direction intended for parking. Crank 36 continues to rotate into the position in FIG. 4, lever 54 comes down and the body and frame 12 go up from the reaction and release of compression on tires 14. Tires 14 are lifted at the bottoms thereof almost off the ground (the extent of lifting can be controlled as a function of the speeds of cranks 36 and the power from the engine). When the crank 36, in bearings 38, is up, the frame is downmost in its elevation with a few degrees time lag being allowed, and the maximum lateral velocity of the ball joints is desired when the frame is at its uppermost or lowest elevation. When the tires reach the position in full lines of FIG. 4 where forces on the ground are minimum, arms 28 move on around fully from the aforementioned tolerance from X to Y and pull the tires about lower balls 20 over at the bottoms thereof into the position and direction intended. The frame and body return to the downward position, tires 14 again contact and compress into the ground as in FIG. 3 and the cycle has started again. With this arrangement, the vehicle has "walked" with slight vibration smoothly from its beginning position in FIG. 3 to follow the dotted lines of the tires 14 in FIG. 4. Once the frame and body, heavy with respect to the wheels 16, start in motion they continue slowly and smoothly until parking is completed. With this action properly calibrated (the parts are exaggerated in FIGS. 3 and 4 where the crank distances are out of proportion and some movements are more pronounced for illustrative purposes), the automobile movement would be in the nature of a vibration hardly noticeable to the occupants and causing slight wear on the tires, probably less than in turning corners. The rear wheels of the vehicle turn about the differential in opposite directions; and the vehicle turns in short radius about the center of the rear wheels rather than the normal large radius, the center of which is far away from the car.

*Lockable shock absorber*

Figure 7:
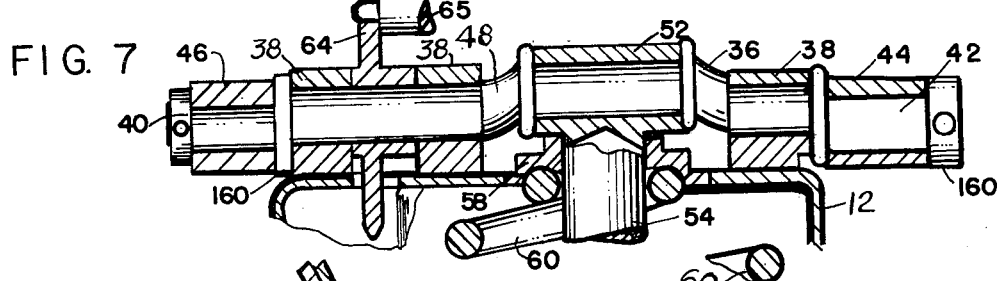
FIG. 7 is a cross-sectional view taken substantially along the lines of 7—7 in FIG. 6.
Figure 8:
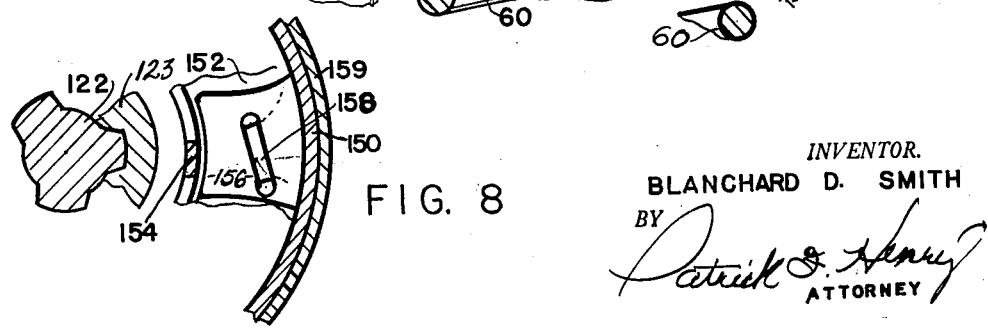
FIG. 8 is an enlarged view taken substantially along the line 8—8 of FIG. 6 and showing a detail of shock absorber mechanism.

The shock absorber 50 used in the present invention may be any type member which is normally resilient but can be made to become rigid with the crank 36. However, the instant invention provides one type of novel shock absorber which is particularly useful in this combined shifting and suspension system and is also a very desirable type shock reducer. Referring to FIGS. 6, 7, and 8 the crank portion 48 of the crank member 36 is attached to the rod 54 by means of the split bearing 52 and a cap and screw arrangement 120. Rod 54 is hollow and receives therein for sliding motion a spiral worm rod 122 which is attached at its lower end to pin 56 on the arm 24. The lead and helix angle on this worm 122 is sufficient to spin a nut 123 mounted thereon, spinning same below the bottom of rod 54 and above pin 56, whenever a load on the frame 12 causes the worm 122 to move within rod 54 against the pressure of spring 60. Spring 60 is a spiral wound spring mounted with small end 124 in cup 58 and lower end in cup 62. A rigid dome cap 126 is fixedly secured to the lower end of rod 54 above and over nut 123 and has internally thereof an upper ball bearing race 128 and lower race 130 fastened by rivet 132 retaining ball bearings 134 against a race portion 136 of nut 123. Nut 123 has an annular flange portion 138 in which are holes 140. Dome cap 126 has a guide bore 142 therein which receives a pin and rod 144 further supported in bearing 146 on cup 58 and actuatable vertically to slip into one of the holes 140 thereby locking rod 54 to worm 122 through the nut 123. A spring 148 urges the pin 144 into holes 140 but the wire 61 normally holds them out of engagement during the normal driving of the car. Nut 123 is surrounded by an annular bearing surface 150 mounted on dome cap 126.

Mounted for movement on a pressed metal plate 152 held by a tab 154 on the bottom of nut 123 is a friction brake shoe 156 which bears against the inside of the bearing surface 150 in response to rotational forces on the nut 123 caused when the worm 122 is moving. Brake shoe 156 is moved by centrifugal force inside of the bearing surface 150. Shoes 156 are guided by a slanting lip 158 and are designed to minimize the drag when the frame drops and on the upward travel of the frame the drag increases to act as a normal shock absorber for the car. The shoes 156 are therefore freely movable inside of the shock absorber and are slung outwardly when moving on and with the nut 123 as it is spun around the worm 122. Therefore, as long as the pin 144 is out of any of the holes 140 the shock absorber 50 acts as any normal shock absorber. However when the operator engages pin 144 in hole 140 by means of cable 61, the rotational engagement of the nut 123 is prevented and rod 54 becomes a solid lever from crank 36 down through pin 56 in the manner in FIGS. 3 to 5, inclusive. All mechanism is protected by a flexible cover 159.

In FIG. 7 it is seen that collars 160 hold the various members in place on the crank 36 and that by manually pushing the rod 65 against the face of the sprocket 64, the pin on the end of said rod (see FIG. 7) will drop into sprocket 64 in the proper position to lock the control arms 28 in proper aligned position for normal, correct steering and tracking and then there cannot be any improper movement accidentally. Pin 65 moves only in a straight line on its supports toward the face of sprocket 64 and when pushed against sprocket 64, pin 65 will always contact the sprocket face at one certain radius thereon and will inherently drop into a hole therein which is located at that radius. Pin 65 drops in at the proper place in the same manner and by the same arrangement as found on numerous other machines, such as a lathe, wherein it is used to lock the rotating gears. That is, with the pin 65 mounted for movement only in a straight line to be pushed manually against the surface of the face of sprocket 64 and to strike the face of sprocket 64 in the same circular path each time, it must necessarily drop into a hole in the sprocket 64 at the position of the circle. In other words, the hole always lines up with the pin within one complete rotation of the sprocket 64. With this construction, the front suspension is always correct and safe and the present apparatus will not affect normal driving or alignment. When desired to jack the car up by a bumper jack, shock absorbers 50 are locked in order to aid the operator and merely overcome the main objection to a bumper jack.

While I have shown and described in detail a preferred embodiment of my invention and for illustration combined same with a usual type front suspension and steering, the drive may be installed either way and on either end and other and further alterations, modifications, substitutions, eliminations, changes, and revisions may be made within the scope of my invention as defined in the appended claims.

I claim:

1. In an apparatus for shifting one end of a vehicle about the other end thereof, said vehicle having a frame and body supported on wheels, resilient tires mounted on said wheels, means mounting each of the wheels supporting said one end of the vehicle for pivotal movement about corresponding axes which extend longitudinally of the vehicle and are laterally spaced outwardly of a respective side of said frame at said one end, means connected with said mounting means and said frame for compressing the tires on said one end and including means to inactivate said compressing means during normal road operation of said vehicle, other means secured to a portion of said mounting means synchronized with said compressing means for starting said vehicle on said one end of said vehicle body and frame in motion in the direction lateral to the normal direction of movement of the vehicle, said means for compressing including means releasing said compression on said tires creating a time of minimum load on said tires and permitting said vehicle body and frame to spring upwardly while moving in said lateral direction, and said other means being operable about the time of minimum load on said tires to shift the bottoms thereof about said longitudinal axes in the direction the frame and body is moving, whereupon said vehicle has moved in said lateral direction and said wheels are caused to follow the movement.

2. In an apparatus for shifting one end of a vehicle about the other end thereof, said vehicle having a frame and body supported on wheels, resilient tires mounted on said wheels, means mounting each of the wheels supporting said one end of the vehicle for pivotal movement about corresponding axes which extend longitudinally of the vehicle and are laterally spaced outwardly of a respective side of said frame at said one end, means for compressing the bottom of said tires against the ground an amount greater than normal load thereon, power means on said vehicle frame for driving said last named means, wheel shifting means on said frame above the axes of said wheels and movable against said wheels and being shiftable relative to said frame to shift said wheels about said longitudinal axis, means connecting said last named wheel shifting means with said power means, said means for compressing being synchronized with said means movable against said wheels, by virtue of which said vehicle body and frame is started in motion on compression and release of said tires and continues in motion in the direction lateral to the normal direction of movement of said vehicle while said tries and wheels are shifted to follow said body upon release of compression on said wheels.

3. In an apparatus for shifting one end of a vehicle about the other end thereof, said vehicle having a frame and body supported on wheels, resilient tires mounted on said wheels, means mounting each of the wheels supporting said one end of the vehicle for pivotal movement about corresponding axes which extend longitudinally of the vehicle and are laterally spaced outwardly of a respective side of said frame at said one end, said last named means including an upper control arm and a lower control arm on each wheel, power means on said frame for shifting said vehicle by means of the power produced within the vehicle itself, a normally resilient power member between said frame and lower control arm, means selectively causing said normally resilient power member to become a rigid power member, said power means on said frame driving said rigid power member against said lower control arm and then releasing same, thereby causing an oscillation against the bottom of said resilient tires causing said tires to become abnormally compressed upon downward movement of the frame due to the movement of said rigid power member, other means pushing against the upper control arm during compression of said tires causing said frame to move lateral to the normal direction of movement of the vehicle, said power member upon releasing said tires from compression causing the frame to spring upwardly, and said other means pulling on said upper control arm causing said control arm when said tires are released thereby to pull the upper part of said respective wheels thereby moving the lower part of said wheels in the direction of movement of said body, whereby said body is made to move in the intended lateral direction and said wheels are caused to follow each movement thereof.

4. In an apparatus for shifting one end of a vehicle about the other end thereof, said vehicle having a frame and body supported on wheels, resilient tires mounted on said wheels and said wheels being mounted on said vehicle by a wheel assembly which includes an upper control arm and a lower control arm on each of said wheels, means mounting each of the wheels supporting said one end of the vehicle for pivotal movement about corresponding axes which extend longitudinally of the vehicle and are laterally spaced outwardly of a respective side of said frame at said one end, a normally resilient shock absorber located on said vehicle between said lower arm and said vehicle frame, means for converting said shock absorber into a rigid power member between the frame and the lower arm, means connecting said upper control arm on said frame for limited, lateral movement in both directions, said means mounting each of the wheels supporting said one end including pivot means connecting said upper arms with the upper portion of said wheel assembly and pivot means connecting said lower arm with said lower portion of said wheel assembly, power means for driving said power member between said frame and said lower arm thereby causing the tires to be compressed beyond normal load at one point thereof, said power means including means acting on said upper control arms to start the movement of said frame upon compression of said tires in the direction of motion lateral to the normal direction of movement of the vehicle, said power means including means releasing said tires from compression to spring to substantially unloaded condition, said power means acting on said upper control arm to move the upper portion of said wheels away from the intended direction and the lower casing of said tire toward the intended direction about said corresponding longitudinal axis, then said tires being shifted and again compressed to begin another cycle, and said cycles being repeated until said vehicle is shifted laterally the desired amount.

5. In an apparatus for shifting one end of a vehicle about the other end thereof, said vehicle having a frame and body supported on wheels, resilient tires mounted on said wheels, means mounting each of the wheels supporting said one end of the vehicle for pivotal movement about corresponding axes which extend longitudinally the vehicle and are laterally spaced outwardly of a respective side of said frame at said one end and including upper control arms on said frame and connected respectively with each of said wheels above the wheel axis and lower control arms pivoted on said frame and being connected respectively with said wheels below the wheel axis, a normal resilient shock absorber member between said upper and lower arms and being connected at one end to a pivot means on said lower arm, means for causing said normally resilient shock absorber member to become rigid, a crank member on said frame adjacent each of said wheels, crank means connecting the other end of said shock absorber to a position on said crank, means connecting said upper control arms to another portion on each of said respective crank members, and drive means for driving said crank members when said shock absorber is locked, by virtue of all of which upon one stroke of said cranks, the body will move down and then in the direction lateral to the normal direction of movement of the vehicle and upon another stroke thereof, said body moves upwardly still in said lateral direction while the wheels become less loaded, whereupon the crank causes the wheels to follow the body and so on in repetitive cycles until the vehicle is shifted.

6. In an apparatus for shifting one end of a vehicle about the other end thereof, said vehicle having a frame and body supported on wheels, resilient tires mounted on said wheels supporting said one end of the vehicle, means supporting said last mentioned wheels for pivotal movement about corresponding axes which extend longitudinally of the vehicle and laterally spaced outwardly of the respective side of said frame at said one end and including an upper control arm and a lower control arm on each of said wheels and each control arm being connected by a pivot means with a respective upper and lower portion above and below the respective axes of the individual wheels, a pair of crank members on said frame, there being one crank member adjacent each of said wheel upper control arms, power take-off means from said vehicle engine, power transfer means from said power take-off means to each of said crank members, an upper control arm crank portion on each of said crank members, each of said upper control arm crank portions connected to a respective upper arm, a shock absorber attachment portion on each of said crank members spaced from said upper control arm crank portion, a first shock absorber member attached to each of said shock absorber attachment portions, a second absorber member movably engaging each of said first shock absorber members, connective means connecting said second absorber member to each of a respective lower control arm, means for locking said first and second members to form a rigid driving member, by virtue of all of which the actuation of said power transfer means causes said cranks to rotate, thereby in one position thereof moving said body and frame downwardly on said wheels while at the same time substantially therewith said upper control arms start said body to move in the direction lateral to the normal direction of movement of the vehicle and in another position said cranks release said body and frame thereby unloading said wheels and while substantially synchronized therewith said upper control arms move said wheels about said longitudinal axes to follow the movement of said body and frame.

7. In an apparatus for shifting one end of a vehicle about the other end thereof, said vehicle having a frame and a body supported on wheels, resilient tires mounted on said wheels, power means on said frame, means mounting each of the wheels supporting said one end of the vehicle for pivotal movement about corresponding axes which extend longitudinally of the vehicle and are laterally spaced outward of a respective side of said frame at said one end, means driven by said power means when said vehicle is at rest to start said frame in motion for subsequent movement in the lateral direction intended, said last named means including means to inactivate said means to start said frame in motion during normal road operation of said vehicle, said means to start said frame in motion causing said frame to create a time of abnormal compression on said tires and including means to relieve said abnormal compression thereon, and other means on said frame for shifting said wheels laterally about said longitudinal axes after said vehicle body and frame are in motion to cause the bottoms of said wheels to shift on said body and frame and eventually to return to normal fore-and-aft position thereon when said vehicle is parked, whereupon said vehicle has moved in said lateral direction and said wheels are caused to follow the movement.

8. In an apparatus for shifting one end of a vehicle about the other end thereof, said vehicle having a frame and body supported on wheels, resilient tires mounted on said wheels, means mounting each of the wheels supporting said one end of the vehicle for pivotal movement about corresponding axes which extend longitudinally of the vehicle and are laterally spaced outwardly of a respective side of said frame at said one end, power means on said frame for shifting said vehicle by means of the power produced within the vehicle itself, means drivable by said power means to start said frame in motion upwardly and downwardly so that it may subsequently be moved in the direction lateral to the normal directions of movement of said vehicle, and other driven means for alternatively moving the bottoms of said wheels about said longitudinal axes with and at times ahead of said frame, by virtue of which said frame is moving in the lateral direction intended and said wheels are moving with and at times ahead of the side thereof so that the entire vehicle is being shifted in the intended direction and said wheels will follow said vehicle and eventually return to normal position.

9. In an apparatus for shifting one end of a vehicle about the other end thereof, said vehicle having a frame and body supported on wheels, and resilient tires mounted on said wheels, means mounting each of the wheels supporting said one end of the vehicle for pivotal movement about corresponding axes which extend longitudinally of the vehicle and are laterally spaced outwardly of a respective side of said frame at said one end, power means on said frame for shifting said vehicle by means of the power produced within the vehicle itself, first means on said vehicle for exerting pressure on the tires on said wheels, second means operable with said first named means to exert lateral force on the frame in the direction of intended lateral movement, thereby starting said frame in motion, said means for exerting pressure being controlled automatically to release quickly said pressure on the bottom of said wheels, thereby creating a time of reduced load thereon, and said second means on said vehicle being synchronized with said first means for moving said wheels laterally about their respective longitudinal axes on said frame at the time of reduced load on said tires and in the direction to follow the movement of said frame and body, by virtue of which said frame and body is caused to move in the intended direction and said wheels move therewith and at times relative thereto to follow the movement of said frame.

10. In an apparatus for shifting one end of a vehicle about the other end thereof, said vehicle having a frame and body supported on wheels, resilient tires mounted on said wheels, means mounting each of the wheels supporting said one end of the vehicle for pivotal movement about corresponding axes which extend longitudinally of the vehicle and are laterally spaced outwardly of a respective side of said frame at said one end, power means on said frame for shifting said vehicle by means of the power produced within the vehicle itself, means for compressing the tires on the end of the vehicle being shifted, other means operable therewith for starting said frame in motion in the intended lateral direction of movement, said means for compressing the tires including means for releasing said compression on the tires permitting said tires to spring upwardly and said body and frame to spring upwardly whereupon the bottoms of said tires are loaded a reduced amount from that load normally placed thereon when the vehicle is in normal driving condition, and said other means being synchronized therewith to move said wheels about their respective longitudinal axes on the end of the vehicle being shifted substantially at the time of substantial minimum load on said tires, whereby the end of the vehicle is shifted by moving the frame laterally in the direction intended and shifting the wheels about their respective longitudinal axes to follow the lateral movement of the body and frame at the end of the vehicle being shifted.

References Cited in the file of this patent

UNITED STATES PATENTS

| | | |
|---|---|---|
| 1,544,611 | Thompson et al. | July 7, 1925 |
| 1,811,152 | Seversky | June 23, 1931 |
| 2,639,777 | Dull | May 26, 1953 |
| 2,640,693 | Magrum | June 2, 1953 |
| 2,662,604 | Henderson | Dec. 15, 1953 |